(12) United States Patent
Chen et al.

(10) Patent No.: US 9,961,177 B2
(45) Date of Patent: May 1, 2018

(54) METHOD AND DEVICE FOR ADDING CONTACT INFORMATION

(71) Applicant: TENCENT TECHNOLOGY (SHENZHEN) COMPANY LIMITED, Shenzhen, Guangdong (CN)

(72) Inventors: Yu Chen, Shenzhen (CN); Jing He, Shenzhen (CN); Xi Liao, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days. days.

(21) Appl. No.: 15/157,937

(22) Filed: May 18, 2016

(65) Prior Publication Data
US 2016/0269520 A1 Sep. 15, 2016

Related U.S. Application Data

(63) Continuation of application No. PCT/CN2014/091391, filed on Nov. 18, 2014.

(30) Foreign Application Priority Data

Nov. 19, 2013 (CN) .......................... 2013 1 0582597

(51) Int. Cl.
*H04M 3/42* (2006.01)
*H04M 1/2745* (2006.01)
*H04M 1/725* (2006.01)

(52) U.S. Cl.
CPC . *H04M 1/274516* (2013.01); *H04M 1/27455* (2013.01); *H04M 1/274533* (2013.01); *H04M 1/72547* (2013.01)

(58) Field of Classification Search
CPC ..... H04M 1/274516; H04M 1/274533; H04M 1/27455
See application file for complete search history.

(56) References Cited

U.S. PATENT DOCUMENTS 6,873,861 B2   3/2005  Awada et al.
2009/0280786 A1 * 11/2009  Ziklik ............... H04M 3/42059
                                                455/415

(Continued)

FOREIGN PATENT DOCUMENTS

CN     1779705 A    5/2006
CN   101399872 A    4/2009

(Continued)

OTHER PUBLICATIONS

International Search Report for International Application No. PCT/CN2014/091391 dated Feb. 27, 2015 in 2 pages.

(Continued)

*Primary Examiner* — Charles Appiah
*Assistant Examiner* — Alexander Yi

(57) ABSTRACT

A communication message, which carries contact displaying information of a target contact may be received. The contact displaying information of the target contact may be displayed on a communication interface. Contact information of the target contact may be obtained when a select instruction corresponding to the contact displaying information of the target contact is received. The contact information of the target contact may be added to an address book.

10 Claims, 9 Drawing Sheets

(56) References Cited

U.S. PATENT DOCUMENTS

2014/0075430 A1* 3/2014 Zheng .................. G06F 8/62
717/174
2015/0006659 A1 1/2015 Cai et al.

FOREIGN PATENT DOCUMENTS

| CN | 102082818 A | 6/2011 |
| --- | --- | --- |
| CN | 102882771 A | 1/2013 |
| CN | 103152462 A | 6/2013 |
| CN | 103326923 A | 9/2013 |

OTHER PUBLICATIONS

International Preliminary Report on Patentability for International Application No. PCT/CN2014/091391 dated May 24, 2016 in 5 pages.
Office Action Issued in Chinese Application No. 201310582597.0 dated Jun. 28, 2017, 10 pages.
Office Action Issued in Chinese Application No. 201310582597.0 dated Jan. 10, 2018.

* cited by examiner

METHOD AND DEVICE FOR ADDING CONTACT INFORMATION

CROSS-REFERENCE TO RELATED APPLICATIONS

This application is a continuation of International Application No. PCT/CN2014/091391, filed on Nov. 18, 2014. This application claims the benefit and priority of Chinese Application No. 201310582597.0, filed on Nov. 19, 2013. The entire disclosures of each of the above applications are incorporated herein by reference.

BACKGROUND

Field

The present disclosure relates to a field of computer technologies, and more particularly, to a method and device for adding contact information.

Description of the Related Art

With rapid development of communication technologies and terminal technologies, a terminal device with a communication function, such as a mobile phone has been indispensable tool in people's daily lives. The terminal device is generally configured with an address book. Contact information of several contacts (such as telephone numbers) is recorded in the address book.

SUMMARY

Embodiments of the present disclosure provide a method and device for adding contact information to enhance efficiency for adding the contact information to the address book.

An embodiment of the present disclosure provides a method for adding contact information, including: receiving a communication message, which carries contact displaying information of a target contact; displaying the contact displaying information of the target contact on a communication interface; obtaining contact information of the target contact when a select instruction corresponding to the contact displaying information of the target contact is received; and adding the contact information of the target contact to an address book.

Another embodiment of the present disclosure provides another method for adding the contact information, including: receiving a contact information sharing request from a first terminal device; the contact information sharing request carrying contact information of a target contact; generating contact displaying information of the target contact according to the contact information of the target contact; and sending a communication message, which carries the contact displaying information, to a second terminal device; wherein the second terminal device displays the contact displaying information on a communication interface, obtains the contact information of the target contact when a select instruction corresponding to the contact displaying information of the target contact is received and adds the contact information of the target contact to an address book.

Another embodiment of the present disclosure provide a terminal device, comprising: a reception module, to receive a communication message, which carries contact displaying information of a target contact; a displaying module, to display the contact displaying information on a communication interface; an adding module, to obtain contact information of the target contact when a select instruction corresponding to the contact displaying information of the target contact is received and add the contact information of the target contact to an address book.

Another example of the present disclosure provide a server, including: a reception module, to receive a contact information sharing request from a first terminal device, the contact information sharing request carrying contact information of a target contact; a generation module, to generate contact displaying information of the target contact according to the contact information of the target contact; and a transmission module, to send a communication message, which carries the contact displaying information, to a second terminal device; wherein the second terminal device displays the contact displaying information on a communication interface, obtains the contact information of the target contact when a select instruction corresponding to the contact displaying information of the target contact is received and adds the contact information of the target contact to an address book.

In embodiments of the present disclosure, a communication message, which carries contact displaying information of a target contact may be received. The contact displaying information of the target contact may be displayed on a communication interface. Contact information of the target contact may be obtained when a select instruction corresponding to the contact displaying information of the target contact is received. The contact information of the target contact may be added to an address book. Therefore, in the communication interface, if the user clicks the contact displaying information in the communication interface, the processing for adding the corresponding contact information to the address book may be triggered. Therefore, the efficiency of adding the contact information to the address book may be enhanced.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION OF THE PREFERRED EMBODIMENT

For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In a daily communication, a user frequently shares his/her contacts with other users. Generally, the user may send contact information of a contact, such as a contact ID (Identifier) (such as a name) and a telephone number to another user via a short message, email or Instant Messaging (IM) tool etc. After the contact information, such as the contact ID and the telephone number is received, the contact information of the contact may be manually added to the address book of the terminal device of the user receiving the contact information.

With the above method for adding the contact information, the contact information needs to be manually added. In the process for manually adding the contact information, the user needs to interact with the terminal device many times which is time-consuming and resource-consuming.

Figure 1:
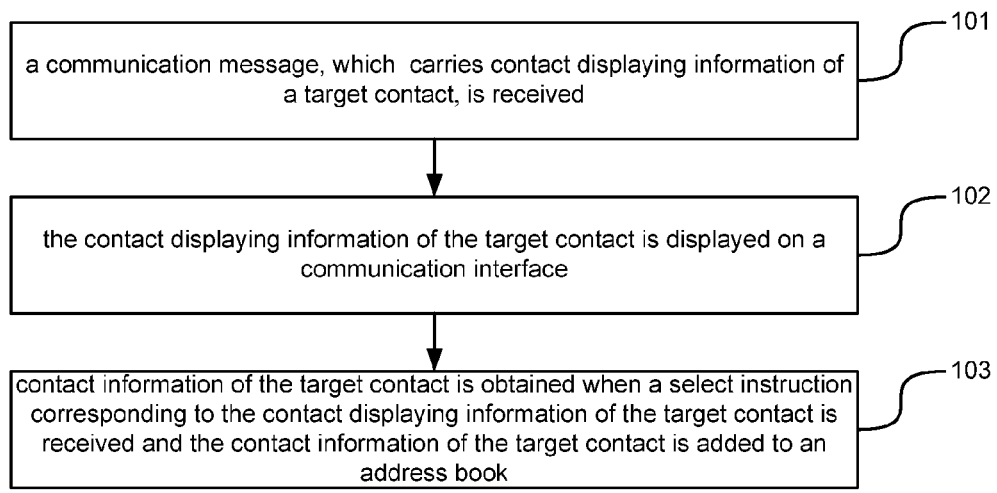
FIG. 1 is a flow chart illustrating a method for adding contact information in accordance with various embodiments of the present disclosure.

An embodiment of the present disclosure provides a method for adding contact information. In this method, a processing flow of a terminal device may be shown in FIG. 1 and may include following blocks.

In block 101, a communication message, which may carry contact displaying information of a target contact, may be received.

In block 102, the contact displaying information of the target contact may be displayed on a communication interface.

In block 103, contact information of the target contact may be obtained when a select instruction corresponding to the contact displaying information of the target contact is received and the contact information of the target contact may be added to an address book.

Figure 2:
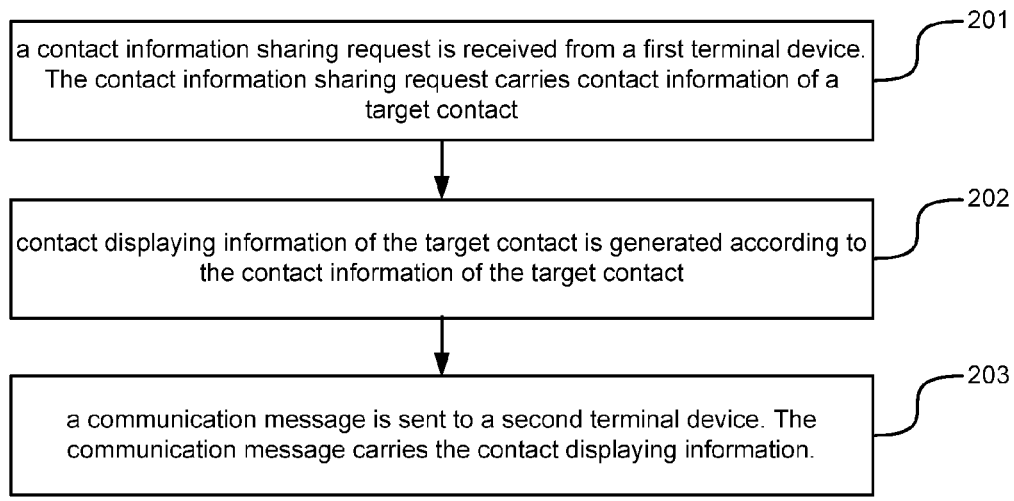
FIG. 2 is a flow chart illustrating another method for adding contact information in accordance with various embodiments of the present disclosure.

The processing flow of a server side may be shown in FIG. 2 and may include following blocks.

In block 201, a contact information sharing request may be received from a first terminal device. The contact information sharing request may carry contact information of a target contact.

In block 202, contact displaying information of the target contact may be generated according to the contact information of the target contact.

In block 203, a communication message carrying the contact displaying information may be sent to a second terminal device, so that the second terminal device may display the contact displaying information on a communication interface, obtain the contact information of the target contact when a select instruction corresponding to the contact displaying information of the target contact is received and add the contact information of the target contact to an address book.

In embodiments of the present disclosure, a communication message, which carries contact displaying information of a target contact may be received. The contact displaying information of the target contact may be displayed on a communication interface. Contact information of the target contact may be obtained when a select instruction corresponding to the contact displaying information of the target contact is received. The contact information of the target contact may be added to an address book. Therefore, in the communication interface, if the user clicks the contact displaying information in the communication interface, the processing for adding the corresponding contact information to the address book may be triggered. Therefore, the efficiency of adding the contact information to the address book may be enhanced.

An embodiment of the present disclosure provides a method for adding contact information, which may be implemented by the server and the terminal device and may be directly implemented between terminal devices. The terminal device may be a mobile terminal device with the communication function, such as a mobile phone and a tablet PC. In this embodiment of the present disclosure, the address book, to which the contact information is added, may be a telephone book or a contact list of a communication application (such as Instant Messaging (IM) software and an E-mail address). This embodiment may be described taking the telephone book for example.

Figure 3:
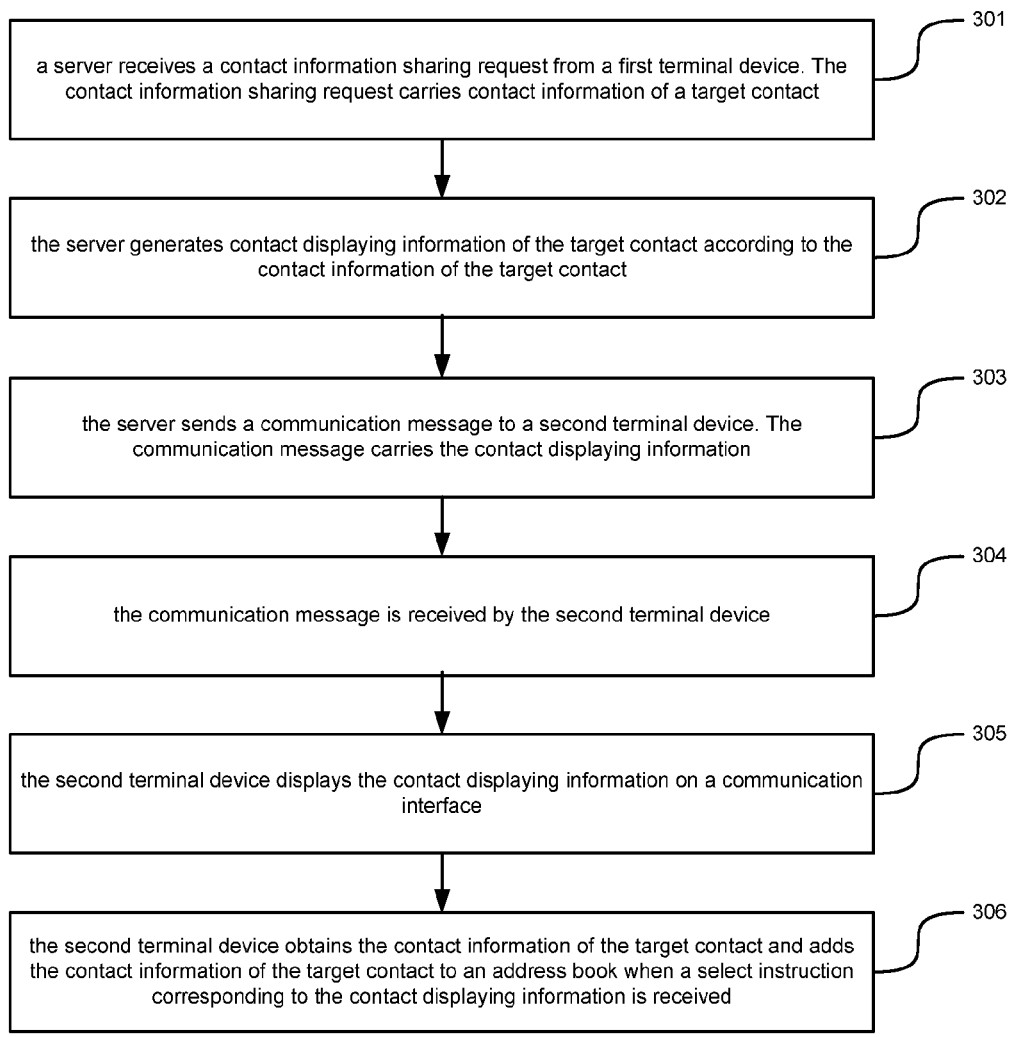
FIG. 3 is a flow chart illustrating another method for adding contact information in accordance with embodiments of the present disclosure.

The processing flow of the method may be shown in FIG. 3 and may include following blocks.

In block 301, a server may receive a contact information sharing request from a first terminal device. The contact information sharing request may carry contact information of a target contact.

The terminal device may send the contact information sharing request for requesting for the contact information of a contact (a target contact) from other terminal devices. The target contact may be any designated contact and may be a contact in an address book of the first terminal device. The contact information may be communication-related information of the contact. The contact information may include: a name of a contact (such as a name or a nickname), an account ID (such as a telephone number and an IM account) and at least one of communication address information, E-mail address, company name, position, birthday, personal page and avatar, etc.

Figure 4A:
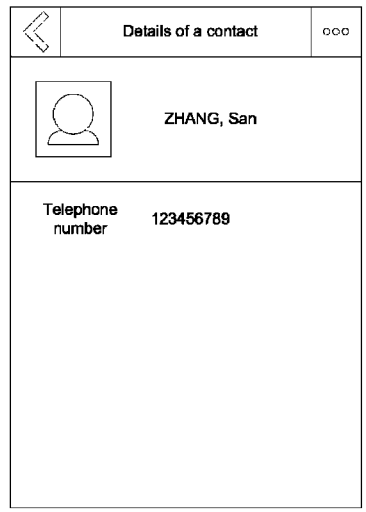
FIGS. 4A to 4E are diagrams illustrating displaying interfaces of terminals in accordance with various embodiments of the present disclosure.
Figure 4B:
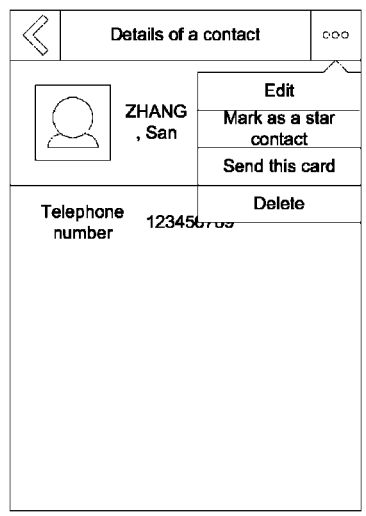
Figure 4C:
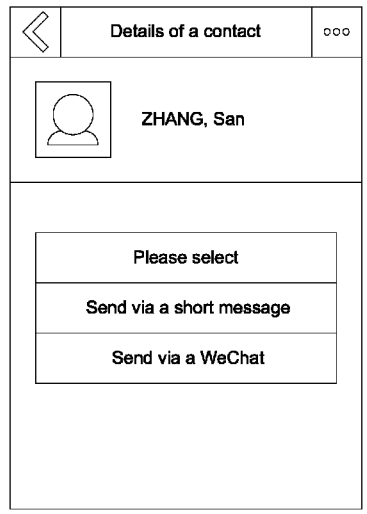
Figure 4D:
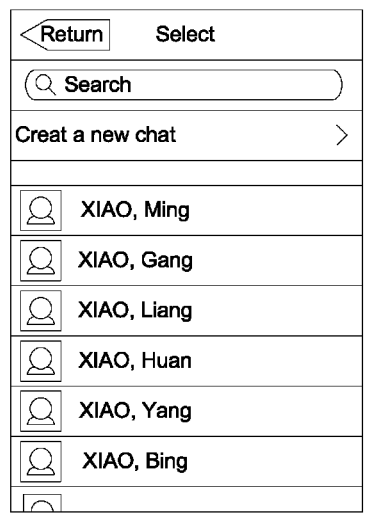
Figure 4E:
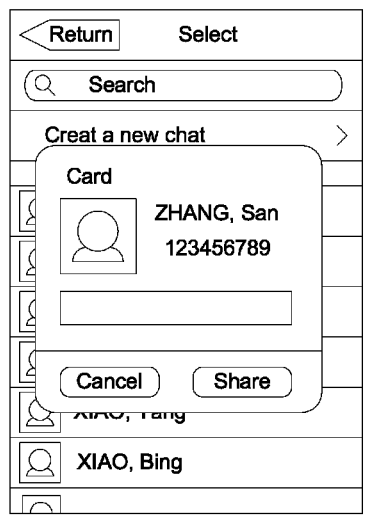

In this embodiment, an application for managing an address book (such as a telephone book) may be installed in the first terminal device. The application may be a communication application (such as a WeChat and an E-mail) or may be an application independent of the communication application. The application may have a function for sharing the contact information. A contact list (such as a telephone book) may be set in the application. A contact details page, i.e. the page for displaying details of the contact information shown in FIG. 4a may be displayed when a contact (i.e. the target contact) is selected. An option for sending the contact information, such as an option of "send this card" (the contact information may be recorded in a format of a card) shown in FIG. 4b may be configured in a menu of the contact details page. The option may be clicked and a select window for displaying multiple sending modes, such as a short message mode and a WeChat mode, shown in FIG. 4c, may be displayed. It may be configured that the processing flow of the embodiment of the present disclosure may be supported by one or multiple transmission modes. A select interface for selecting a target account shown in FIG. 4d may be displayed after the user selects one sending mode. The contact list of the communication application corresponding to the transmission mode selected by the user may be displayed on the select interface. The user may select the target account for receiving the card from the contact list and a determination window shown in FIG. 4e may be displayed. The user may input dialog content in the determination window and send the card without inputting the dialog content. The user may click a share button and trigger the terminal device to generate the contact information sharing request. The contact information sharing request may carry the contact information of the target contact selected by the user. Furthermore, the contact information sharing request may further carry the account ID of the target account selected by the user.

In block 302, the server may generate contact displaying information of the target contact according to the contact information of the target contact.

The contact displaying information may be contact information which may be displayed in a communication interface of the terminal device. The contact information may include multiple pieces of information, such as a name of a contact, account ID (telephone number) and E-mail address. The contact displaying information of the target contact may include partial or all of the contact information of the target contact. For instance, it may be configured that the contact displaying information may include the name of the contact and the account ID. Furthermore, the contact displaying information of the target contact may include the contact information of the target contact and may further include other information besides the contact. For instance, the contact displaying information may further include: the type of the address book (such as the telephone book), to which the telephone number of the target contact may belong and an operator, to which the telephone number of the target contact may belong, etc. For another instance, if the contact displaying information includes partial contact information of the target contact, the server may generate a contact information page (include all of the contact information of the target contact) according to the contact information of the target contact. A link (such as a Uniform Resource Locator (URL)), with which the terminal device may access a page, may be set for the contact information page. It may be configured that the contact displaying information may include the link.

According to an embodiment, the server may select several pieces of important contact information (the contact information, which is to be selected, such as the name of the contact and the telephone number may be configured in advance.) from multiple pieces of contact information. The contact information page may be generated according to the contact information of the target contact and the URL, with which the terminal device may access a page, may be configured for the contact information page. Then, the URL and the selected contact information may be packaged to obtain the contact displaying information, i.e. the contact displaying information of the target contact.

In block 303, the server may send a communication message to second terminal device. The communication message may carry the contact displaying information.

The communication message may be a communication message of any communication application. The communication application may be an IM application (such as the WeChat) and a non-IM application (such as an E-mail), etc. The second terminal device may be a terminal device designated by the first terminal device. For instance, the contact information sharing request may carry the ID of the second terminal device. Alternatively, the contact information sharing request may carry an account ID of the target account. The second terminal device may be an entry terminal device of the target account. A corresponding relationship for communication (the corresponding relationship may be stored in the server) maybe established between the second terminal device and the first terminal device in advance.

In this embodiment, the server may determine the terminal device which may perform a login operation with the target account according to the account ID of the target account carried in the contact information sharing request. The terminal device may be taken as the second terminal device and the communication message carrying the contact displaying information may be sent to the terminal device.

In block 304, the communication message may be received by the second terminal device.

In the IM application, the communication message may be a chatting message. In an E-mail address, the communication message may be an E-mail.

In block 305, the second terminal device may display the contact displaying information on a communication interface.

Figure 5A:
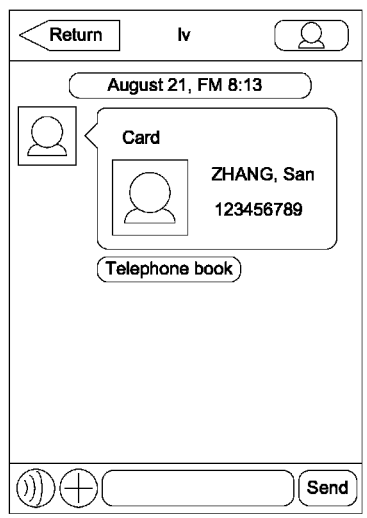
FIGS. 5A to 5C are diagrams illustrating displaying interfaces of terminals in accordance with various embodiments of the present disclosure.

In this embodiment, as shown in FIG. 5a, the second terminal device may display the communication interface of the communication application (such as the WeChat). The communication interface may be a chatting interface between the local target account of the second terminal device and the log-in account of the first terminal device (such as "lv" in the figure). An input box of the log-in account of the first terminal device may be displayed on the communication interface and the contact displaying information of the target contact may be displayed in the input box. The contact displaying information may be displayed in a format of a cart of a contact. As shown in the figures, the contact displaying information of the card may include: a name, telephone number and avatar of the contact.

In block 306, the second terminal device may obtain the contact information of the target contact and add the contact information of the target contact to an address book when a select instruction corresponding to the contact displaying information is received.

The address book may be a kind of locally-stored address book corresponding to the target contact stored. For instance, if the target contact is a phone contact, the address book may be a telephone book. If the target contact is a WeChat contact, the address book may be a WeChat book.

In this embodiment, when the second terminal device displays the contact displaying information, a select button may be set for displaying the contact displaying information. For instance, the card of the contact may be configured as the select button. In another example, a separate select button may be set besides configuring the contact displaying information as the select button. When the select button is clicked, a select instruction corresponding to the contact displaying information may be generated.

Block 306 may include multiple processing modes and the processing modes may be configured based on actual demand. Several processing modes may be described hereinafter.

Mode One

In step one, when the select instruction corresponding to the contact displaying information is received, a contact information request corresponding to the target contact may be sent to a server.

The contact information request may be sent to request for the contact information of the target contact.

In this embodiment, the second terminal device may obtain a link corresponding to the contact information page from the communication message and set a corresponding relationship between the link and the select button. When the select instruction is received, the contact information request (or called a webpage request) carrying the link may be sent to the server. The link may correspond to the contact information page of the target contact. Therefore, the contact information request may be the contact information request corresponding to the target contact.

The processing of the server side may include: receiving the contact information request corresponding to the target contact from the second terminal device and send the contact information of the target contact to the second terminal device.

In this embodiment, the server may obtain the link in the contact information request, obtain the corresponding contact information page stored at local according to the link and send the contact information page to the second terminal device.

In step two, the contact information of the target contact sent from the server may be received.

In step three, the contact information of the target contact may be added to the address book.

Figure 5B:
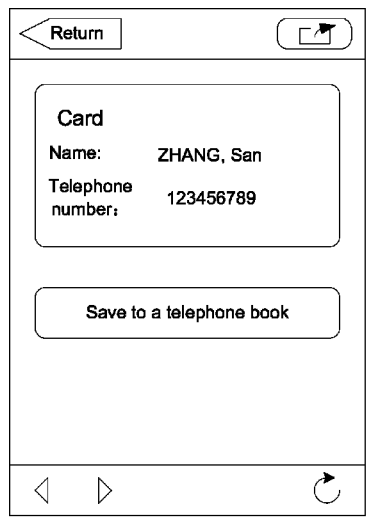
Figure 5C:

In the embodiments of steps two and three, after the second terminal device receives the contact information, the contact information may be directly added to the address book. In another example, the contact information may be displayed and the user may make a determination as to whether to add the contact information to the address book. For instance, as shown in FIG. 5b, after the second terminal device receives the contact information page, the second terminal device may display the contact information page. The contact information page may include an option for storing the contact information. If the user clicks the option, a storage instruction may be triggered. As shown in FIG. 5c, the second terminal device may display an interface for establishing contact information and automatically fill out the interface with the contact information. Then, the user may click the next step and the contact information may be added to the address book. In another example, the second terminal device may not display the interface for establishing the contact information and directly add the contact information of the target contact received from the server to the address book.

Mode Two

When the select instruction corresponding to the contact displaying information is received, the contact information of the target contact may be obtained from the contact displaying information and added to the address book.

In this embodiment, the contact displaying information of the target contact may include partial or all of the contact information of the target contact and contact information in the contact displaying information may be added to the address book. Therefore, since the contact information needs not to be obtained from the server, the processing efficiency may be enhanced.

In the above processing of the embodiment of the present disclosure, the processing of sending the contact displaying information to the terminal device via the server may be described. Furthermore, the first terminal device may directly send the contact displaying information to the second terminal device according to the contact information of the target contact. For instance, the first terminal device may send the contact displaying information to the second terminal device via a communication mode, such as Bluetooth.

In this embodiment of the present disclosure, the communication message carrying the contact displaying information of the target contact may be received and the contact displaying information may be displayed on a communication interface. When the select instruction corresponding to the contact displaying information is received, the contact information of the target contact may be obtained and added to the address book. Therefore, in the communication interface, the processing for adding the corresponding contact information to the address book may be triggered by an operation for clicking and selecting the contact displaying information in the communication message. Therefore, efficiency for adding the contact information to the address book may be enhanced.

Figure 6:
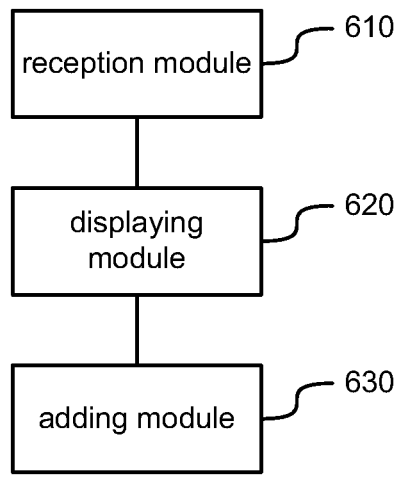
FIG. 6 is a diagram illustrating structure of a terminal device in accordance with various embodiments of the present disclosure.

Based on the same technical conception, an embodiment of the present disclosure may further provide a terminal device. As shown in FIG. 6, the terminal device may include: a reception module 610, configured to receive a communication message; an adding module 630, configured to obtain contact information of a target contact and add the contact information to an address book.

The terminal device may include: a displaying module 620, configured to display contact displaying information carried in the communication message in a communication interface.

The reception module 610 is further configured to receive a select instruction corresponding to contact displaying information of the target contact and the adding module 630 is further configured to obtain the contact information of the target contact according to the select instruction.

The adding module 630 is further configured to: send a contact information request corresponding to the target contact when the select instruction corresponding to the contact displaying information is received; receive the contact information of the target contact sent from a server; and add the contact information of the target contact to the address book.

The contact displaying information may include: partial or all of the contact information of the target contact.

The adding module 630 is further configured to obtain the contact information of the target contact from the contact displaying information and add the contact information to the address book if the select instruction corresponding to the contact displaying information is received.

In this embodiment of the present disclosure, the communication message carrying the contact displaying information of the target contact may be received, the contact displaying information may be displayed on the communication interface, the contact information of the target contact may be received and the contact information of the target contact may be added to the address book when the select instruction corresponding to the contact displaying information is received. Therefore, in the communication interface, the processing for adding the corresponding contact information to the address book may be triggered by an operation for clicking and selecting the contact displaying information in the communication message. Therefore, efficiency for adding the contact information to the address book may be enhanced.

Figure 7:
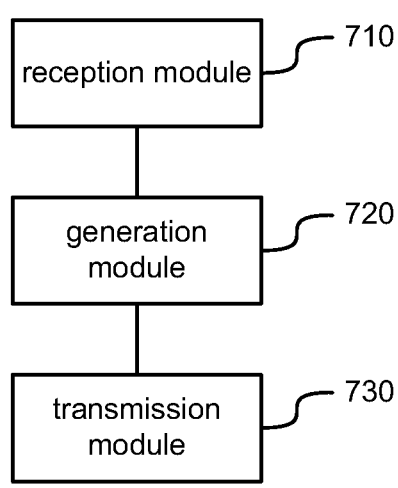
FIG. 7 is a diagram illustrating structure of a server in accordance with various embodiments of the present disclosure.
Figure 8:
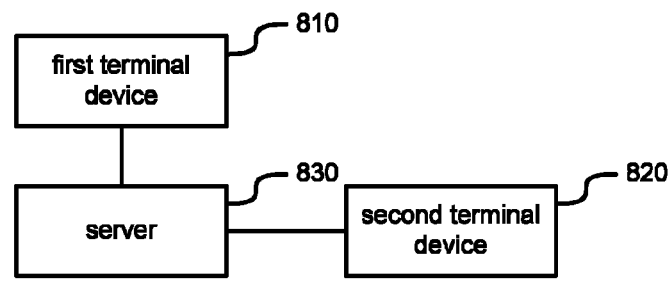
FIG. 8 is a diagram illustrating structure of a system for adding contact information in accordance with various embodiments of the present disclosure.

Based on the same technical conception, an embodiment of the present disclosure may further provide a server. As shown in FIG. 7, the server may include: a reception module 710, configured to receive a contact information sharing request, which carries contact information of a target contact, from a first terminal device; a generation module 720, configured to generate contact displaying information of the target contact according to the contact information of the target contact; and a transmission module 730, configured to send a communication message to a second terminal device. The communication message may carry the contact displaying information, so that the contact displaying information may be displayed on a communication interface, contact information of the target contact may be obtained and added to the address book if a select instruction corresponding to the contact displaying information is received.

The contact displaying information may include: all of partial of the contact information of the target contact.

The reception module 710 may be further configured to: receive a contact information request corresponding to the target contact sent from the second terminal device; and send the contact information of the target contact to the second terminal device.

In this embodiment of the present disclosure, the communication message carrying the contact displaying information of the target contact may be received, the contact displaying information may be displayed on the communication interface, the contact information of the target contact may be obtained and added to the communication address when the select instruction corresponding to the contact displaying information is received. Therefore, in the communication interface, the processing for adding the corresponding contact information to the address book may be triggered by an operation for clicking and selecting the contact displaying information in the communication message. Therefore, efficiency for adding the contact information to the address book may be enhanced.

Based on the same technical conception, an embodiment of the present disclosure may further provide a system for adding contact information. As shown in FIG. 7, the system may include: a first terminal device 810, a second terminal device 820 and a server 830.

The server 830 may be configured to receive a contact information sharing request from the first terminal device 810. The contact information sharing request may carry contact information of a target contact. The service 830 may generate contact displaying information of the target contact according to the contact information of the target contact and send a communication message, which may carry the contact displaying information, to the second terminal device 820.

The second terminal device 820 may receive the communication message, display the contact displaying information on a communication interface, obtain the contact information of the target contact and add the contact information of the target contact to an address book if a select instruction corresponding to the contact displaying information is received.

In this embodiment of the present disclosure, the communication message carrying the contact displaying information of the target contact may be received, the contact displaying information may be displayed on the communication interface, the contact information of the target contact may be obtained and added to the communication address when the select instruction corresponding to the contact displaying information is received. Therefore, in the communication interface, the processing for adding the corresponding contact information to the address book may be triggered by an operation for clicking and selecting the contact displaying information in the communication message. Therefore, efficiency for adding the contact information to the address book may be enhanced.

Figure 9:
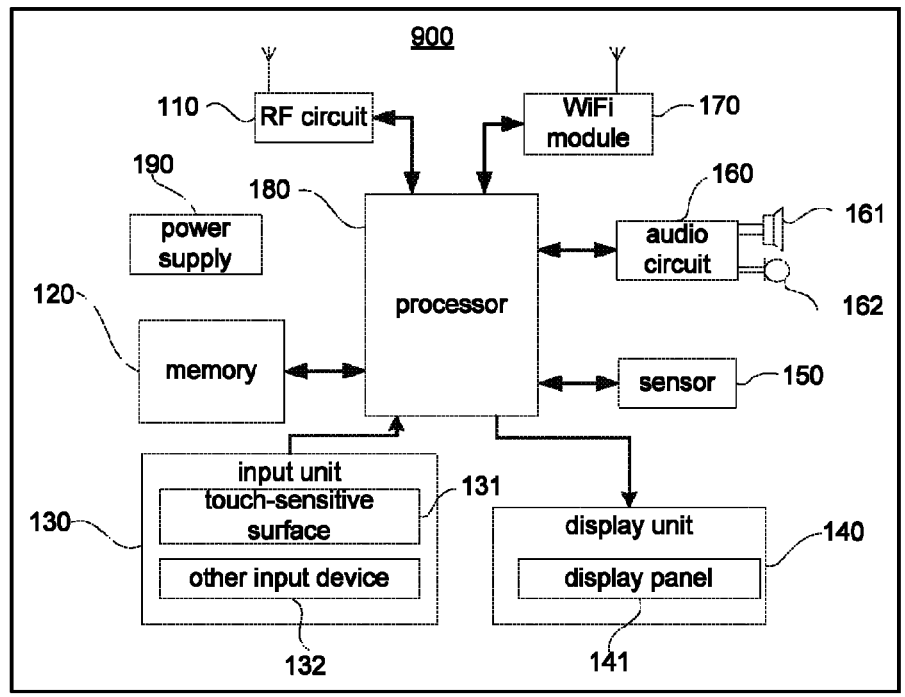
FIG. 9 is a schematic diagram illustrating structure of another terminal device in accordance with various embodiments of the present disclosure.

Referring to FIG. 9, FIG. 9 is a diagram illustrating a terminal device with a touch-sensitive surface in accordance with various embodiments of the present disclosure. The terminal device may be used for implementing the above method for adding the contact information.

The exemplary device 900 can include an RF (Radio Frequency) circuit 110, a memory 120 including one or more machine-readable storage media, an input unit 130, a display unit 140, a sensor 150, an audio circuit 160, a Wireless module (e.g., Wi-Fi, WiFi) 170, a processor 180 including one or more processing cores, a power supply 190, and/or other components. It is well known to an ordinary skilled in the art of the present disclosure that the structure of the terminal device shown in FIG. 9 cannot limit the terminal device in embodiments of the present disclosure. The terminal devices in the embodiments of the present disclosure may include more or less components than those in FIG. 9. In another example, the terminal device in embodiments of the present disclosure may consist of combination of some components or different component layouts.

The RF circuitry 110 may be used to send and receive information or send and receive a signal during communication. In particular, after receiving downlink information from a base station, such information can be processed by the one or more processors 180. Furthermore, the data related to the uplink can be sent to the base station. Generally, the RF circuit 110 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuitry 110 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory 120 can be used for storing software programs and modules. By running software programs and modules stored in the memory 120, the processor 180 can perform various functional applications and data processing. The memory 120 can include a program storage area and a data storage area. The program storage area can store the operating system, applications (such as sound playback, image playback, etc.) required by at least one function. The data storage area can store data (such as audio data, phone book, etc.) created when using the terminal device 900. In addition, the memory 120 may include a high-speed random access memory, a non-volatile memory, such as at least one disk memory, flash memory, and/or other volatile solid-state memory elements. Accordingly, the memory 120 may further include a memory controller to provide the processor 180 and the input unit 130 with access to the memory 120.

The input unit 130 can be used to receive inputted numeric or character information, and to generate signal input of keyboard, mouse, joystick, and trackball or optical signal input related to the user settings and function controls. Specifically, the input unit 130 may include a touch sensitive surface 131 and other input device(s) 132. The touch-sensitive surface 131, also known as a touch screen or touch panel, may collect touch operations that a user conducts on or near the touch-sensitive surface 131. For example, a user may use a finger, a stylus, and any other suitable object or attachment on the touch-sensitive surface 131 or on an area near the touch-sensitive surface 131. The touch-sensitive surface 131 may drive a connecting device based on a preset program. The touch sensitive surface 131 may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 180, and receive commands sent from the processor 180 to execute. Furthermore, the touch sensitive surface 131 can be realized by resistive, capacitive, infrared surface acoustic wave, and/or other types of surface touch. In addition to the touch sensitive surface 131, the input unit 130 may also include other input device(s) 132. Specifically, the other input device(s) 132 may include, but be not limited to, a physical keyboard, function keys (such as volume control buttons, switch buttons, etc.), a trackball, a mouse, an operating lever, or combinations thereof.

The display unit 140 can be used to display information inputted by the user, information provided to the user, and a variety of graphical user interfaces of the terminal device 900. These graphical user interfaces can be formed by images, text, icons, videos, and/or any combinations thereof. The display unit 140 may include a display panel 141 configured by, e.g., LCD (Liquid Crystal Display), OLED (Organic Light-Emitting Diode), etc. Further, the touch sensitive surface 131 may cover the display panel 141. When the touch sensitive surface 131 detects a touch operation on or near the touch sensitive surface, the touch operation can be sent to the processor 180 to determine a type of the touch operation. Accordingly, the processor 180 can provide visual output on the display panel 141. Although in FIG. 9 the touch-sensitive surface 131 and the display panel 141 are shown as two separate components to achieve input and output functions, in some embodiments, the touch sensitive surface 131 and the display panel 141 can be integrated to perform input and output functions.

The terminal device 900 may further include at least one sensor 150, such as optical sensors, motion sensors, and other suitable sensors. Specifically, the optical sensors may include an ambient optical sensor and a proximity sensor. The ambient optical sensor may adjust brightness of the display panel 141 according to the brightness of ambient light. The proximity sensor can turn off the display panel 141 and/or turn backlighting, when the terminal device 900 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The terminal device 900 can also be configured with, e.g., a gyroscope, a barometer, a hygrometer, a thermometer, an infrared sensor, and/or other sensors.

The audio circuit 160, the speaker 161, and the microphone 162 may provide an audio interface between the user and terminal device 900. The audio circuit 160 may transmit an electrical signal converted from the received audio data to the speaker 161 to convert into audio signal output. On the other hand, the microphone 162 can convert the collected sound signal to an electrical signal, which can be received by the audio circuit 160 to convert into audio data. The audio data can be output to the processor 180 for processing and then use the RF circuit 110 to transmit to, e.g., another terminal. Alternatively, the audio data can be output to the memory 120 for further processing. The audio circuitry 160 may also include an earplug jack to provide communications between the peripheral headset and the terminal device 900.

The WiFi may belong to a short distance wireless transmission technology. The terminal device 900 may use the WiFi module 170 to help users send and receive emails, browse websites, access streaming media, etc. The WiFi module 170 can provide users with a wireless broadband Internet access. Although the WiFi module 170 is shown in FIG. 9, it can be understood that the WiFi may not be a necessary component of the terminal device 900 and may be omitted without changing the essential scope of the present disclosure.

The processor 180 can be a control center of the terminal device 900: using a variety of interfaces and circuits to connect various parts, e.g., throughout a mobile phone; running or executing software programs and/or modules stored in the memory 120; calling the stored data in the memory 120; and/or performing various functions and data processing of the terminal device 900 to monitor the overall mobile phone. The processor 180 may include one or more processing cores. In an exemplary embodiment, the processor 180 may integrate an application processor with a modulation and demodulation processor. The application processor is mainly used to process an operating system, user interface, and applications. The modulation and demodulation processor is mainly used to deal with wireless communications. In various embodiments, the modulation and demodulation processor may or may not be integrated into the processor 180.

The terminal device 900 may further include a power supply 190 (such as a battery) to power various components of the terminal. In an exemplary embodiment, the power supply can be connected to the processor 180 via the power management system, and thus use the power management system to manage charging, discharging, and/or power management functions. The power supply 190 may also include one or more DC or AC power supplies, a recharging system, a power failure detection circuit, a power converter or inverter, a power status indicator and/or any other suitable components.

Although not shown in FIG. 9, the terminal device 900 can further include a camera, a Bluetooth module, etc. without limitation. Specifically, the terminal device 900 can have a display unit of a touch screen display, a memory, and one or more programs stored in the memory. The terminal can be configured to use one or more processors to execute the one or more programs stored in the memory. The execution (e.g., may be referred to as a first execution) may include following operational commands: receiving a communication message, which carries contact displaying information of a target contact; displaying the contact displaying information of the target contact on a communication interface; obtaining contact information of the target contact when a select instruction corresponding to the contact displaying information of the target contact is received; and adding the contact information of the target contact to an address book.

The method for obtaining the contact information of the target contact when the select instruction corresponding to the contact displaying information of the target contact is received may include: sending a contact information request of the target contact to a server when the select instruction corresponding to the contact displaying information of the target contact is received; and receiving the contact information of the target contact from the server.

The contact displaying information may include: partial or all of the contact information of the target contact. The communication interface may be a communication interface of WeChat, the target contact may be a WeChat contact and the address book is a WeChat book.

The method for obtaining the contact information of the target contact when the select instruction corresponding to the contact displaying information of the target contact is received may include: obtaining the contact information of the target contact from the contact displaying information when the select instruction corresponding to the contact displaying information of the target contact is received.

In this embodiment of the present disclosure, the communication message carrying the contact displaying information of the target contact may be received, the contact displaying information may be displayed on the communication interface, the contact information of the target contact may be received and the contact information of the target contact may be added to the address book when the select instruction corresponding to the contact displaying information is received. Therefore, in the communication interface, the processing for adding the corresponding contact information to the address book may be triggered by an operation for clicking and selecting the contact displaying information in the communication message. Therefore, efficiency for adding the contact information to the address book may be enhanced.

Figure 10:
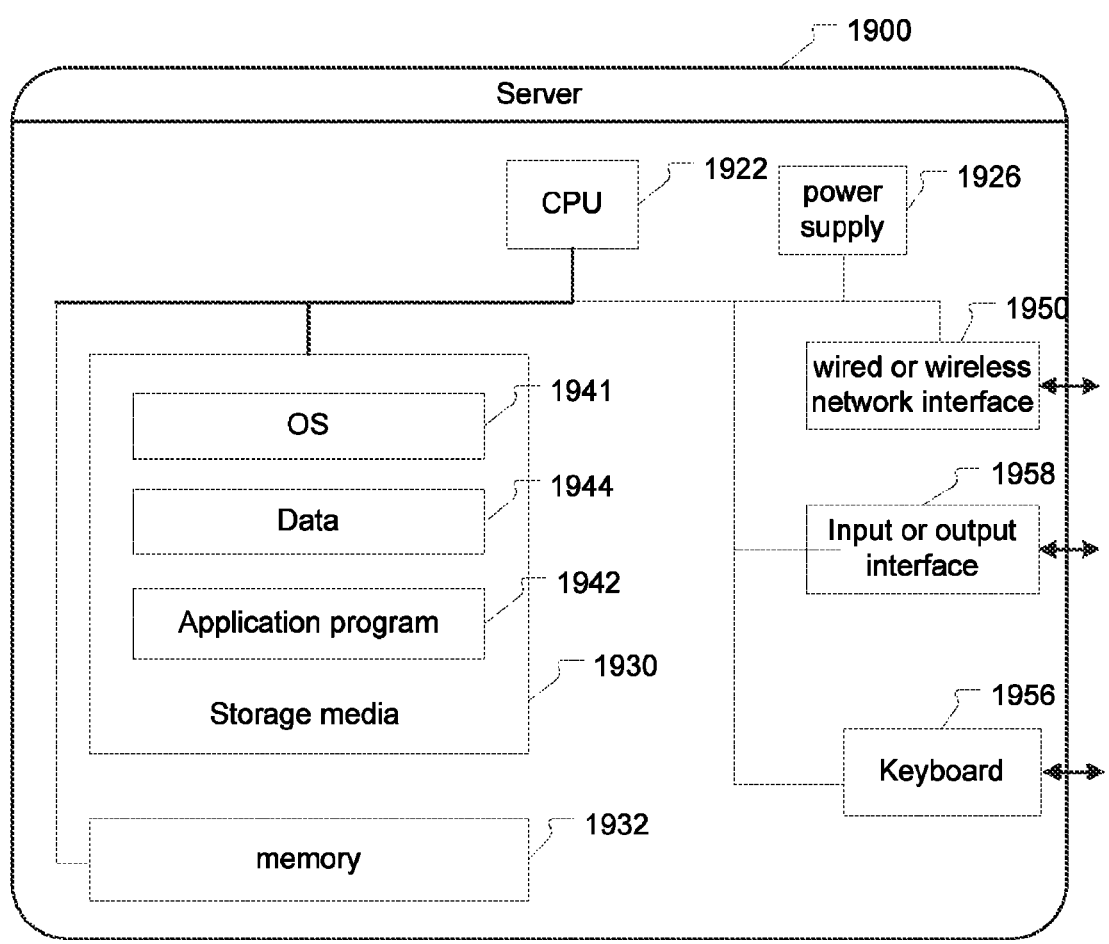
FIG. 10 is a diagram illustrating structure of another server in accordance with various embodiments of the present disclosure.

FIG. 10 is a diagram illustrating structure of a server in accordance with various embodiments of the present disclosure. There may be large differences between the server 1900 and another server due to differences of configuration and performances. The server 900 may include one or more than one Central Processing Unit (CPU) 1922 (for instance, one or more than one processor) and a memory 1932, a storage media 1930 (for instance one or more than one mass storage device) for storing one or more than one application program 1942 or data 1944. The memory 1932 and the storage media 1930 may temporarily or permanently store the data or program. The program in the storage media 1930 may include one or more than one module (is not shown in the figure). Each module may include a serial of instruction operations of the server. Furthermore, the CPU 1922 may be configured as communicating with the storage media 1930 and execute the serial of instruction operations in the storage media 1930.

The server 1900 may include one or more than one power supply 1926, one or more than one wired or wireless network interface 1950, one or more than one input or output interface 1958, one or more than one keyboard 1956 and/or one or more than one OS 1941, such as Windows Server™, Mac OS X™, Unix™, Linux™, FreeBSD™, etc.

The server 1900 may include a memory, one or more than one program. The one or more than one program may be stored in the memory and may be executed by one or more than one processor to perform following operations: receiving a contact information sharing request from a first terminal device; the contact information sharing request carrying contact information of a target contact; generating contact displaying information of the target contact according to the contact information of the target contact; and sending a communication message, which carries the contact displaying information, to a second terminal device, so that the second terminal device may display the contact displaying information on a communication interface, obtain the contact information of the target contact and add the contact information of the target contact to an address book when a select instruction corresponding to the contact displaying information is received.

The contact displaying information may include: partial or all of the contact information of the target contact.

The method may further include: receiving a contact information request of the target contact from the second terminal device; and sending the contact information of the target contact to the second terminal device.

In this embodiment of the present disclosure, the communication message carrying the contact displaying information of the target contact may be received, the contact displaying information may be displayed on the communication interface, the contact information of the target contact may be obtained and added to the communication address when the select instruction corresponding to the contact displaying information is received. Therefore, in the communication interface, the processing for adding the corresponding contact information to the address book may be triggered by an operation for clicking and selecting the contact displaying information in the communication message. Therefore, efficiency for adding the contact information to the address book may be enhanced.

It should be noted that when the device for adding the contact information provided in the above examples adds the contact information, the device may be described taking the division of the above each function module for example. In practice, the above functions may be implemented by different functional modules as needed. That is, the structure of the device may be divided into different function modules to implement partial or all of the above described functions. Furthermore, the conception of the device for adding the contact information may be the same as that of the method for adding the contact information provided in the above embodiments, which may not be repeated here.

It may be well known by an ordinary skilled in the art of the preset disclosure that partial or all blocks of the above embodiments may be implemented via hardware and may be implemented by hardware instructed by a program. The program may be stored in a machine readable storage media. The storage media may be a Read-only Memory (ROM), a disk or a Compact Disk (CD), etc.

The foregoing description only describes preferred embodiments of the present invention and is not used for limiting the protection scope thereof. Any modification, equivalent substitution, or improvement made without departing from the spirit and principle of the present invention should be covered by the protection scope of the present invention.

What is claimed is:

1. A method for adding contact information, comprising:
receiving, by a second terminal device, a communication message, which carries contact displaying information of a target contact, from a server;
wherein the contact displaying information of the target contact is generated by the server using contact information of the target contact obtained from a contact information sharing request, and
wherein the contact information sharing request is used for a first terminal device to provide the contact information of the target contact in an address book of the first terminal device to the second terminal device and the contact information of the target contact comprises: a name and an account ID of the target contact, and an ID of the second terminal device;

displaying, by the second terminal device, the contact displaying information of the target contact comprising the contact information of the target contact on a communication interface, wherein the contact displaying information comprises a Uniform Resource Locator (URL) of a contact information page, which comprises the contact information of the target contact;
obtaining, by the second terminal device, the contact information of the target contact when a select instruction corresponding to the contact displaying information of the target contact is received; and
adding, by the second terminal device, the contact information of the target contact to an address book,
wherein the contact displaying information comprises: partial or all of the contact information of the target contact; the communication interface is a communication interface of WeChat; the target contact is a WeChat contact and the address book is a WeChat book.

2. The method according to claim 1, wherein obtaining the contact information of the target contact when the select instruction corresponding to the contact displaying information of the target contact is received comprises:
sending a contact information request of the target contact to the server when the select instruction corresponding to the contact displaying information of the target contact is received; and
receiving the contact information of the target contact from the server.

3. The method according to claim 1, wherein obtaining the contact information of the target contact when the select instruction corresponding to the contact displaying information of the target contact is received comprises:
obtaining the contact information of the target contact from the contact displaying information when the select instruction corresponding to the contact displaying information of the target contact is received.

4. A method for adding contact information, comprising:
receiving, by a server, a contact information sharing request for providing contact information of a target contact in an address book of a first terminal device to a second terminal device from the first terminal device;
wherein the contact information sharing request carries the contact information of the target contact, and the contact information of the target contact comprises: a name and an account ID of the target contact, and an ID of the second terminal device;
generating, by the server, contact displaying information of the target contact, which comprises the contact information of the target contact, wherein the contact displaying information comprises a Uniform Resource Locator (URL) of a contact information page, which comprises the contact information of the target contact; and
sending, by the server, a communication message, which carries the contact displaying information, to the second terminal device using the ID of the second terminal device;
wherein the second terminal device displays the contact displaying information on a communication interface, obtains the contact information of the target contact when a select instruction corresponding to the contact displaying information of the target contact is received and adds the contact information of the target contact to an address book,
wherein the contact displaying information comprises: partial or all of the contact information of the target contact; the communication interface is a communication interface of WeChat; the target contact is a WeChat contact and the address book is a WeChat book.

5. The method according to claim 4, further comprising:
receiving a contact information request of the target contact from the second terminal device; and
sending the contact information of the target contact to the second terminal device.

6. A terminal device, comprising:
a reception module, to receive a communication message, which carries contact displaying information of a target contact, from a server;
wherein the contact displaying information of the target contact is generated by the server using contact information of the target contact obtained from a contact information sharing request, and
wherein the contact information sharing request is used for a first terminal device to provide the contact information of the target contact in an address book of the first terminal device to a second terminal device and the contact information of the target contact comprises: a name and an account ID of the target contact, and an ID of the second terminal device;
a displaying module, to display the contact displaying information comprising the contact information of the target contact on a communication interface, wherein the contact displaying information comprises a Uniform Resource Locator (URL) of a contact information page, which comprises the contact information of the target contact; and
an adding module, to obtain contact information of the target contact when a select instruction corresponding to the contact displaying information of the target contact is received and add the contact information of the target contact to an address book,
wherein the contact displaying information comprises: partial or all of the contact information of the target contact; the communication interface is a communication interface of WeChat; the target contact is a WeChat contact and the address book is a WeChat book.

7. The terminal device according to claim 6, wherein the adding module is further to send a contact information request of the target contact to a server when the select instruction corresponding to the contact displaying information of the target contact is received; receive the contact information of the target contact from the server; and add the contact information of the target contact to the address book.

8. The terminal device according to claim 6, wherein the adding module is further to obtain the contact information of the target contact from the contact displaying information when the select instruction corresponding to the contact displaying information of the target contact is received.

9. A server, comprising:
a reception module, to receive a contact information sharing request for providing contact information of a target contact in an address book of a first terminal device to a second terminal device from the first terminal device,
wherein the contact information sharing request carries the contact information of the target contact, and the contact information of the target contact comprises: a name and an account ID of the target contact, and an ID of the second terminal device;
a generation module, to generate contact displaying information of the target contact, which comprises the contact information of the target contact wherein the contact displaying information comprises a Uniform Resource Locator (URL) of a contact information page, which comprises the contact information of the target contact; and a transmission module, to send a communication message, which carries the contact displaying information, to the second terminal device using the ID of the second terminal device;

wherein the second terminal device displays the contact displaying information on a communication interface, obtains the contact information of the target contact when a select instruction corresponding to the contact displaying information of the target contact is received and adds the contact information of the target contact to an address book, wherein the contact displaying information comprises: partial or all of the contact information of the target contact; the communication interface is a communication interface of WeChat; the target contact is a WeChat contact and the address book is a WeChat book.

10. The server according to claim 9, wherein the reception module is further to receive a contact information request of the target contact from the second terminal device; and send the contact information of the target contact to the second terminal device.

* * * * *